(12) United States Patent
Nakagawa et al.

(10) Patent No.: US 11,812,141 B2
(45) Date of Patent: Nov. 7, 2023

(54) CONTROLLER FOR IN-VEHICLE CAMERA

(71) Applicant: DENSO CORPORATION, Kariya (JP)

(72) Inventors: Yusuke Nakagawa, Kariya (JP);
Katsuhiko Hibino, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/657,299

(22) Filed: Mar. 30, 2022

(65) Prior Publication Data

US 2022/0321762 A1 Oct. 6, 2022

(30) Foreign Application Priority Data

Apr. 2, 2021 (JP) ................................. 2021-063502

(51) Int. Cl.
*G03B 15/00* (2021.01)
*H04N 23/66* (2023.01)
(52) U.S. Cl.
CPC ................................. *H04N 23/66* (2023.01)
(58) Field of Classification Search
None
See application file for complete search history.

(56) References Cited

U.S. PATENT DOCUMENTS

| 2020/0037439 | A1* | 1/2020 | Kim | H05K 1/115 |
| 2020/0145582 | A1* | 5/2020 | Harada | G03B 15/00 |
| 2022/0190874 | A1 | 6/2022 | Uematsu et al. | |

FOREIGN PATENT DOCUMENTS

| JP | 2004-208162 A | 7/2004 |
| JP | 2011-206948 A | 10/2011 |
| JP | 2013-093681 A | 5/2013 |

* cited by examiner

*Primary Examiner* — Eileen M Adams
(74) *Attorney, Agent, or Firm* — MASCHOFF BRENNAN

(57) ABSTRACT

A control apparatus for a vehicle-mounted camera system equipped with a vehicle-mounted camera which captures an image of surroundings of a vehicle includes a margin-of-communication obtainer and a restriction determiner. The margin-of-communication obtainer works to determine a value of the margin of differential signaling between the vehicle-mounted camera and the control apparatus. When the value of the margin of differential signaling is lower than a restriction threshold value, the restriction determiner restricts at least one of a communication characteristic of the differential signaling, an application using the captured image, a frame rate in the vehicle-mounted camera, and an image-capturing area. This achieves the control apparatus for the vehicle-mounted camera system which is high in robustness in the differential signaling.

9 Claims, 2 Drawing Sheets

CONTROLLER FOR IN-VEHICLE CAMERA

CROSS REFERENCE TO RELATED DOCUMENT

The present application claims the benefit of priority of Japanese Patent Application No. 2021-063502 filed on Apr. 2, 2021, the disclosure of which is incorporated in its entirety herein by reference.

BACKGROUND

1 Technical Field

This disclosure relates generally to a controller for a vehicle-mounted camera.

2 Background Art

Japanese Patent First Publication No. 2004-208162 discloses a vehicle-mounted camera system using differential signaling, such as LVDS (i.e., Low Voltage Differential Signaling).

The above type of vehicle-mounted camera systems usually have a risk that an error in the differential signaling may arise from electrical disturbance. Particularly, in a case where the above type of vehicle-mounted camera systems are used in operation of ADASs (i.e., Advanced Driver-Assistance Systems), it is advisable that robustness in the differential signaling be improved as much as possible.

SUMMARY

It is, therefore, an object of this disclosure to provide a control apparatus designed to realize vehicle-mounted camera systems which are high in robustness in differential signaling.

According to one aspect of this disclosure, there is provided a control apparatus for a vehicle-mounted camera system equipped with a camera which is mounted in a vehicle and works to capture an image of surroundings of the vehicle comprising: (a) a margin-of-communication obtainer which obtains a value of margin of differential signaling between the control apparatus and the camera mounted in the vehicle using a state of the differential signaling between the control apparatus and the camera; and (b) a restriction determiner which, when the value of margin of communication, as derived by the margin-of-communication obtainer, is lower than a given restriction threshold value, restricts at least one of a communication characteristic of the differential signaling, an application using data on the image captured by the camera, a frame rate in the camera, and an image-capturing area where the camera captures the image of the surroundings of the vehicle.

Symbols in brackets attached to component parts, as discussed below, are used only to indicate exemplified correspondences between the symbols and the component parts. It should be, therefore, appreciated that the invention is not limited to the described component parts.

BRIEF DESCRIPTION OF THE DRAWINGS

The present disclosure will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

An embodiment will be described below with reference to the drawings.

System Structure

Figure 1:
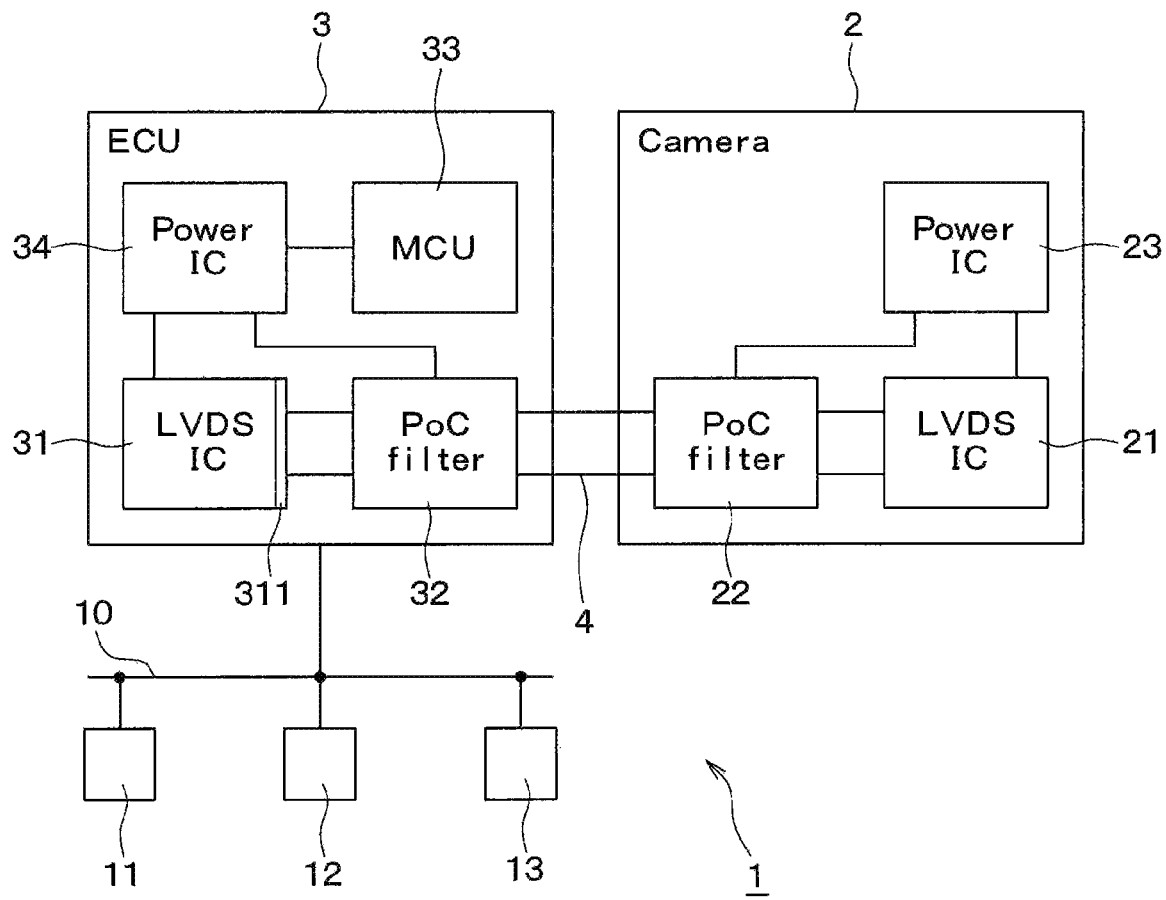
FIG. 1 is a block diagram which illustrates a structure of a vehicle-mounted camera system according to an embodiment.

Referring to FIG. 1, the vehicle-mounted camera system 1 includes the vehicle-mounted camera 2 and the controller 3. The vehicle-mounted camera 2 is installed in a vehicle equipped with the vehicle-mounted camera system 1 (which will also be referred to as a system vehicle) and works to capture an image of surroundings of the system vehicle. The vehicle-mounted camera 2 and the controller 3 are electrically connected together using the communication cable 4.

The vehicle-mounted camera system 1 is engineered to use a technology called PoC (i.e., Power over Coaxial) to achieve transmission of signals and electrical power between the vehicle-mounted camera 2 and the controller 3 through the communication cable 4 which is made of a single coaxial cable. The vehicle-mounted camera system 1 is also configured to achieve transmission of signals between the vehicle-mounted camera 2 and the controller 3 using LVDS (i.e., Low Voltage Differential Signaling).

The controller 3 is connected to the first application 11, the second application 12, and the third application 13 through the in-vehicle network 10 to achieve transmission of information therebetween. The first application 11, the second application 12, and the third application 13 are applications which use data on images captured by the vehicle-mounted camera 2. The first application 11, the second application 12, and the third application 13, as referred to herein, represent modules designed to perform various tasks in the system vehicle or software installed in the modules. The tasks include, for example, ADAS associated operations, such as collision avoidance or self-steering. The controller 3 works to control an imaging operation of the vehicle-mounted camera 2, process data on image captured by the vehicle-mounted camera 2, and output such image data to the first application 11, the second application 12, and the third application 13.

Vehicle-Mounted Camera

For the sake of simplicity, FIG. 1 illustrates functional elements of the vehicle-mounted camera 2 only used for the LVDS and omits imaging elements of the vehicle-mounted camera 2, such as an image sensor and an optical system. FIG. 1 also omits a capacitor component and an inductor component between a LVDS IC and a PoC filter.

The vehicle-mounted camera 2, as illustrated in FIG. 1, includes the camera-mounted communication IC 21, the camera-mounted filter 22, and the power regulator IC 23. The camera-mounted communication IC 21 is made of a LVDS integrated circuit. The camera-mounted filter 22 is made of a PoC filter. The power regulator IC 23 is made of a power supply integrated circuit. The camera-mounted communication IC 21 receives a control signal, as outputted from the controller 3, through the camera-mounted filter 22. The vehicle-mounted camera 2 works to produce image data at a frame rate, as set by the control signal received from the controller 3, in an operating condition determined by image-capturing environments. The power regulator IC 23 works to step down the voltage of electrical power, as delivered from the controller 3 through the communication cable 4 and the camera-mounted filter 22, and supplies it to the camera-mounted communication IC 21 as an operating power.

Controller

The controller 3 includes the controller-mounted communication IC 31, the controller-mounted filter 32, the controller IC 33, and the power source IC 34. The controller-mounted communication IC 31 is made of a LVDS communication integrated circuit. The controller-mounted filter 32 is made of a PoC filter. The controller IC 33 is designed as an MCU (i.e., Micro Controller Unit). The power source IC 34 serves as a power supply IC. The controller-mounted communication IC 31 and the controller IC 33 are operated on electrical power delivered from the power source IC 34. The power source IC 34 serves to supply electrical power to the vehicle-mounted camera 2 through the controller-mounted filter 32 and the communication cable 4.

The controller-mounted communication IC 31 is equipped with the communication port 311 serving as an input/output port for LVDS communications. Specifically, the controller-mounted communication IC 31 is connected at the communication port 311 to the controller-mounted filter 32 to achieve transmission of signals therebetween.

The controller IC 33 is engineered as a vehicle-mounted microcomputer equipped with a CPU, a ROM, a RAM, and a non-volatile memory and works to control an entire operation of the vehicle-mounted camera system 1. The non-volatile memory is made of a non-volatile rewritable memory, such as an EEPROM (i.e., Electronically Erasable and Programmable ROM. The ROM and the non-volatile memory installed in the controller IC 33 each correspond to a non-transitory tangible storage medium.

The CPU in the controller IC 33 reads programs from the ROM or the non-volatile memory and runs them to perform various operating tasks. The programs include instructions which will appear in the following explanation of operations or the following flowchart. The RAM and/or the non-volatile memory is employed to temporarily store data used in the programs executed by the CPU. The ROM and/or the non-volatile memory stores therein various data, such as initial values, look-up tables, and maps, used in the programs.

Figure 2:
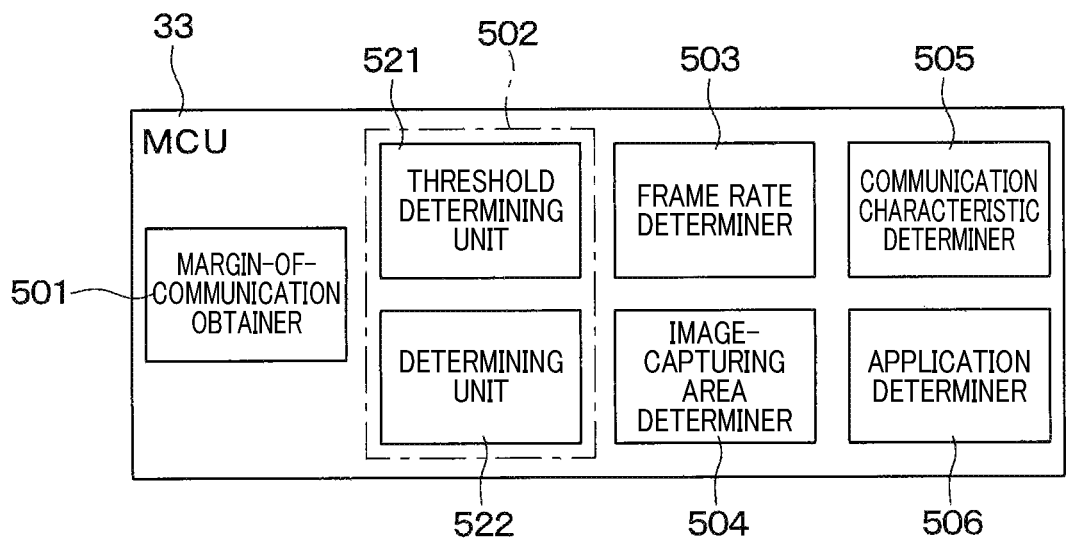
FIG. 2 is a block diagram which illustrates a structure of a controller for the vehicle-mounted camera system in FIG. 1.

FIG. 2 is a block diagram which schematically illustrates functional units realized by execution of a program in the controller IC 33 shown in FIG. 1. Specifically, the controller IC 33 includes the margin-of-communication obtainer 501, the restriction determiner 502, the frame rate determiner 503, the image-capturing area determiner 504, the communication characteristic determiner 505, and the application determiner 506.

The margin-of-communication obtainer 501 works to determine the margin of communication using a communication state of the differential signaling between the controller 3 and the vehicle-mounted camera 2. The margin of communication, as referred to herein, represents a spare measure of differential signaling between the vehicle-mounted camera 2 and the controller 3, that is, a measure of robustness of the differential signaling against an external factor, such as electrical disturbance, mechanical vibration, or change in temperature of the vehicle-mounted camera system 1. The margin of communication may be derived or calculated using at least one of a plurality of different types of parameters, such as a differential signaling waveform, a slew rate, a settling time, a hold time, a bit error rate, and an error correction rate. Specifically, the margin of communication is given by a numerical value which decreases with a decrease in degree of the robustness from a reference value at which the above external factors have standard values thereof.

The restriction determiner 502 works to restrict at least one of a communication characteristic of the differential signaling between the controller 3 and the vehicle-mounted camera 2, the applications, the frame rate, and the image-capturing area when the margin of communication determined by the margin-of-communication obtainer 501 is lower than a given restriction threshold value. The communication characteristic, as referred to herein, includes a communication rate and/or a driving capacity at the communication port 311 (in other words, drive capacity of a communication bus driver installed in the camera-mounted communication IC 21). In this embodiment, the restriction determiner 502 includes the threshold determining unit 521 and the restriction determining unit 522.

The threshold determining unit 521 variably determines the restriction threshold value as a function of an operating condition of the vehicle-mounted camera system 1. The operating condition used to set the restriction threshold value includes at least one of parameters, such as temperature of the vehicle-mounted camera system 1, battery voltage, device supply voltage, and traveling condition of the system vehicle. The battery voltage is a terminal-to-terminal voltage at a storage battery, not shown, mounted in the system vehicle to deliver electrical power to the vehicle-mounted camera system 1. The device supply voltage is the voltage of electrical power delivered to the vehicle-mounted camera system 1, i.e., the controller 3. The traveling condition includes, for example, the speed of the system vehicle.

The restriction determining unit 522 compares between the margin of communication derived by the margin-of-communication obtainer 501 and the restriction threshold value determined by the threshold determining unit 521 to determine whether a restriction operation should be performed. The restriction operation is a task to restrict at least one of the communication characteristic, the applications, the frame rate, and the image-capturing area.

The frame rate determiner 503 works to determine the frame rate in the vehicle-mounted camera 2. The image-capturing area determiner 504 works to determine an image-capturing area where the vehicle-mounted camera 2 is required to take an image. The communication characteristic determiner 505 works to determine the communication characteristic of the differential signaling with the vehicle-mounted camera 2. The application determiner 506 works to select the applications requiring use of data on an image captured by the vehicle-mounted camera 2.

Operation

The operation of the controller 3, a control task executed by the controller 3, and a control program executed by the controller 3 will be described below with reference to FIGS. 1 to 4 along with beneficial advantages offered thereby. In the following discussion, the structure of the controller 3, the control method performed by the controller 3, and the control program will generally be referred to as this embodiment.

The restriction determiner 502 works to decrease the communication rate that is the communication characteristic when the margin of communication derived by the margin-of-communication obtainer 501 is lower than the restriction threshold value. When the margin of communication, as derived by the margin-of-communication obtainer 501, is lower than the restriction threshold value, the restriction determiner 502 stops providing data on a captured image to one(s) of the applications which is relatively low in order of priority in order to ensure delivery of the data on the captured image to one(s) of the applications which is relatively high in order of priority.

In the following discussion, it is assumed that the first application 11 is associated with, for example, collision avoidance control or obstacle detection and has the highest order of priority, the second application 12 is associated with, for example, white lane mark recognition for use in a self-steering system or a lane departure prevention system and has the second highest order of priority, and the third application 13 is associated with, for example, recognition of a speed limit sign for a head-up display and has the third highest order of priority (i.e., the lowest order of priority). In this case, when the margin of communication is low, the restriction determiner 502 stops transmitting the data on the captured image to the second application 12 and the third application 13 which are low in order of priority and deactivate them.

Figure 3:
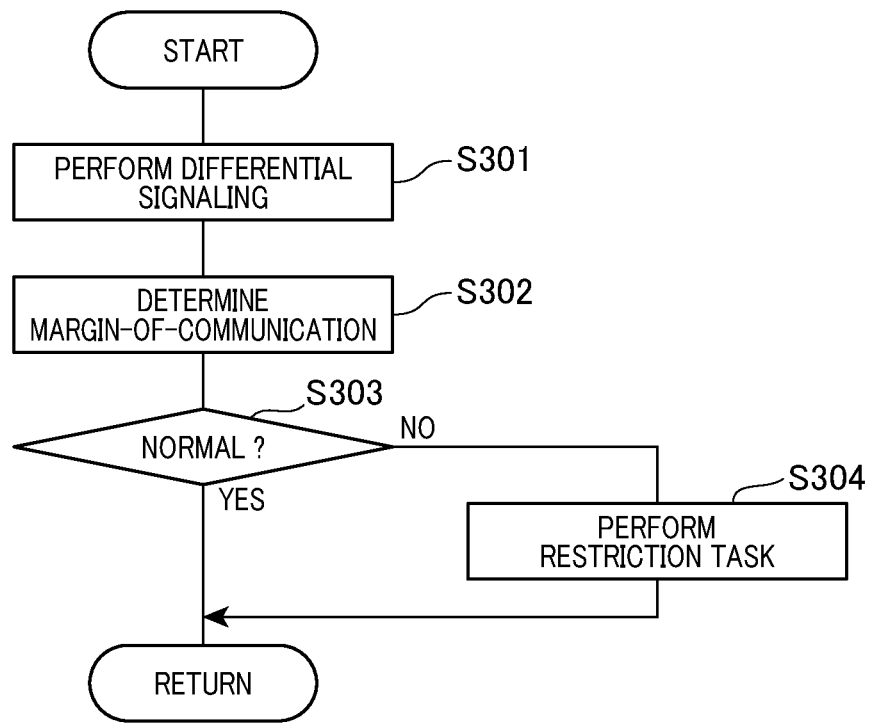
FIG. 3 is a flowchart of a program executed by the controller illustrated in FIG. 2.

FIG. 3 is a flowchart of a sequence of logical steps or program executed by the controller IC 33. Specifically, the CPU of the controller IC 33 reads the program in FIG. 3 from the ROM or the non-volatile memory installed therein and executes the program cyclically at a given time interval.

Upon initiation of the program, the routine proceeds to step S301 wherein the CPU installed in the controller IC 33 performs the differential signaling between the vehicle-mounted camera 2 and the controller 3. The routine then proceeds to step S302 wherein the CPU analyzes the state of the differential signaling executed in step S301 and determine the margin of communication as a function of the state of the differential signaling.

Figure 4:
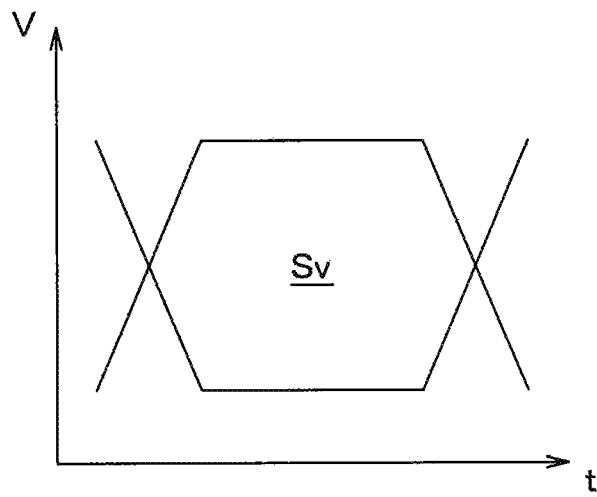
FIG. 4 is a time chart which demonstrates an operation of the controller illustrated in FIG. 2.

The margin of communication may be measured or calculated using a voltage waveform in the differential signaling demonstrated in FIG. 4. Specifically, the margin of communication is determined using parameters: a hexagonal enclosed area Sv, as illustrated in FIG. 4, defined by the voltage waveform and a preselected characteristic value P according to a mathematical equation or by look-up using a map or a table in the following relation.

$$M=F(Sv,P)$$

where M is the margin of communication, F represents the mathematical equation, the map, or the table, and P is given by at least one of differential voltage, slew rate, settling time, hold time, bit error rate, and error correction rate. The larger the hexagonal area Sv, the higher the differential voltage or slew rate, or the longer the settling time or the hold time, or alternatively, the lower the bit error rate or the error correction rate, the higher the value M of the margin of communication will be.

The routine proceeds to step S303 wherein the CPU determines whether the value M of the margin of communication is normal or not using the restriction threshold value. Specifically, the CPU first determines the restriction threshold value as a function of the operating condition of the vehicle-mounted camera system 1. For instance, the CPU calculates the restriction threshold value using a mathematical equation, a map, or a table defined by at least one of parameters, such as temperature of the vehicle-mounted camera system 1, battery voltage, device supply voltage, and the speed of the system vehicle. For example, the farther away from a normal temperature the temperature of the vehicle-mounted camera system 1 is, the smaller the restriction threshold value is determined to be. The farther away from a generally expected speed range the speed of the system vehicle is, i.e., the higher the speed of the system undesirably, the smaller the restriction threshold value is determined to be. The CPU determines whether the value M of the margin of communication is higher than or equal to the restriction threshold value.

If a NO answer is obtained in step S303 meaning that the value of the margin of communication is lower than the restriction threshold value, the routine proceeds to step S304 and then terminates. In step S304, the CPU decreases the communication rate and stops delivering the data on the captured image to the applications whose orders of priority are relatively low. Alternatively, if a YES answer is obtained in step S303 meaning that the value of the margin of communication is higher than or equal to the restriction threshold value, the CPU terminates the program without executing the operation in step S304.

The vehicle-mounted camera system 1 in this embodiment is, as apparent from the above discussion, designed to produce data on a captured image, achieve the differential signaling between the controller 3 and the vehicle-mounted camera 2, and monitor or determine the value of the margin of communication (i.e., the differential signaling) between the controller 3 and the vehicle-mounted camera 2. The vehicle-mounted camera system 1 determines the communication rate (i.e., the rate of the differential signaling) between the controller 3 and the vehicle-mounted camera 2 as a function of the determined value of the margin of communication and selects one(s) of the applications 11, 21, 13 to which the data on the captured image should be delivered. This ensures the stability or reliability in operation of the vehicle-mounted camera system 1, in other words, provides the controller 3 capable of realizing the vehicle-mounted camera system 1 which is high in robustness in the differential signaling between the controller 3 and the vehicle-mounted camera 2.

Modifications

The invention is not limited to the above embodiment, but may be modified in various ways. The following discussion will refer to modifications of the embodiment. The same or similar parts of the vehicle-mounted camera system 1 as described above will be indicated by same or similar reference numbers or symbols, and explanation thereof in detail will be omitted here.

The vehicle-mounted camera system 1 is, as described above, engineered to use a technology called PoC (i.e., Power over Coaxial) to achieve the transmission of signals and electrical power between the vehicle-mounted camera 2 and the controller 3, but however, may alternatively use PoDL. (i.e., Power over Data Lines). The communication between the vehicle-mounted camera 2 and the controller 3 may be achieved by differential signaling other than LVDS (i.e., Low-Voltage Differential Signaling).

The vehicle-mounted camera system 1 (i.e., the controller 3) illustrated in FIG. 1 is electrically connected to three applications: the first to third applications 11, 12, and 13 through the in-vehicle network 10, but however, it may alternatively be connected to two or more than three applications.

The controller 3 in the above embodiment is implemented by an in-vehicle microcomputer designed to have a CPU which reads a program from a ROM and executes the program, but however, may alternatively be made partially or totally by a digital circuit, such as an ASIC (i.e., Application Specific Integrated Circuit) or a FPGA (i.e., Field Programmable Gate Arrays) which are designed to perform the same tasks as described above. In this case, the controller 3 may be made of the above digital circuit and parts shared with the in-vehicle microcomputer.

A program(s) executed to achieve the above described discrete or a sequence of tasks may be downloaded or upgraded using V2X (i.e., Vehicle-to-Everything) or a terminal device mounted in a car manufacturing plant, a service garage, or car dealer of the system vehicle. Such program(s) may be stored in a memory card, an optical disk, or a magnetic disk.

As apparent from the above discussion, the above-described tasks or functional units may be executed or realized by a special purpose computer equipped with a processor and a memory. Alternatively, the above-described tasks or functional units may be executed or constituted by special purpose electronic hardware made of one or more dedicated logic circuits The above-described tasks or functional units may also be executed or made of a special purpose processing unit including a combination of a processor, a memory, and hardware including one or more logic circuits.

The above-described computer-executed program may be stored in a non-transitory tangible storage medium in the form of instructions performed by a computer. In other words the above described tasks or functional units may be provided by a program itself or a non-transitory tangible storage medium in which the program is stored.

The restriction threshold value may be fixed regardless of the operating conditions of the vehicle-mounted camera system 1. In this case, the threshold determining unit 521 illustrated in FIG. 2 may be omitted.

The vehicle-mounted camera system 1 is not limited to the above-described structure or operations. For instance, when the value of the margin of communication is relatively low, the restriction determiner 502 may reduce the communication rate without restricting the applications required to use the data on an image captured by the vehicle-mounted camera 2. Alternatively, when the value of the margin of communication is relatively low, the restriction determiner 502 stops delivering the data on the image to one(s) of the applications which is low in the order of priority without reducing the communication rate.

When the value of the margin of communication, as derived by the margin-of-communication obtainer 501, is lower than a stop threshold value which is lower than the restriction threshold value, the restriction determiner 502 may work to stop the differential signaling between the controller 3 and the vehicle-mounted camera 2. This minimizes the probability of errors in the differential signaling.

When the value of the margin of communication, as derived by the margin-of-communication obtainer 501, is lower than the restriction threshold value, the restriction determiner 502 may reduce the communication rate with or without reduction in the communication rate. Specifically, when the value of the margin of communication is lower than the restriction threshold value, the restriction determiner 502 may decrease the frame rate as long as one(s) of the application (e.g., the first application 11) which is relatively high in the order of priority is enabled to operate. This ensures the stability in executing the application(s) which is relatively high in the order of priority.

When the value of the margin of communication, as derived by the margin-of-communication obtainer 501, is lower than the restriction threshold value, the restriction determiner 502 may work to limit or narrower the image-capturing area with or without the restriction of the applications. Specifically, when the value of the margin of communication is lower than the restriction threshold value, the restriction determiner 502 may decrease the image-capturing area as long as one(s) of the application (e.g., the first application 11) which is relatively high in the order of priority is enabled to operate. This ensures the stability in executing the application(s) which is relatively high in the order of priority.

When the value of the margin of communication, as derived by the margin-of-communication obtainer 501, is lower than the restriction threshold value, the restriction determiner 502 may change the setting of the driving capacity at the communication IC 21 (i.e., the communication characteristic of a communication bus driver installed in the camera-mounted communication IC 21). Specifically, the factor causing a decrease in the margin of communication usually arises from a decrease in the settling time or the hold time resulting from an excessive load on the communication, a rise in temperature, or aging of the vehicle-mounted camera system 1. This increases the driving capacity to improve the margin of communication. If the factor resulting in a decrease in the margin of communication arises from noise from the power supply in the communication between the controller 3 and the vehicle-mounted camera 2, the improvement on the margin of communication is achieved by decreasing the driving capacity within a required range of the rate of the communication.

The restriction determiner 502 may be designed to change the number of the applications to be restricted as a function of a measured value of the margin of communication.

"higher than or equal to the threshold value" and "higher than the threshold value", as referred to herein, may be exchanged as long as it is permitted technically. Similarly, "lower or less than or equal to the threshold value" and "less than the threshold value" may be exchanged as long as it is permitted technically.

Terms "obtain", "estimate", "detect", "calculate", and "extract" may be exchanged with each other as long as it is permitted technically.

The component parts described in the above embodiment are not necessarily essential unless otherwise specified or viewed to be essential in principle. When the number of the component parts, a numerical number, a volume, or a range is referred to in the above discussion, this disclosure is not limited to it unless otherwise specified or viewed to be essential in principle. Similarly, when the shape of, the orientation of, or the positional relation among the component parts is referred to in the above discussion, this disclosure is not limited to it unless otherwise specified or viewed to be essential in principle. Similarly, when the shape of, orientation of, or a positional relation between or among the component parts, this disclosure is not limited to it unless otherwise specified or viewed to be essential in principle.

The above modifications are also not limited to the above described examples. A portion or whole of the embodiment may be combined with one or some of the modifications.

What is claimed is:

1. A control apparatus for a vehicle-mounted camera system equipped with a camera which is mounted in a vehicle and works to capture an image of surroundings of the vehicle, the control apparatus comprising: a margin-of-communication obtainer which obtains a value of a margin of communication between the control apparatus and the camera mounted in the vehicle using a state of differential signaling between the control apparatus and the camera, the margin of communication comprising an additional amount of differential signaling between the control apparatus and the camera indicating a robustness of the differential signaling against an external factor that causes an error in the differential signaling between the control apparatus and the camera; and a restriction determiner which restricts, when the value indicating the margin of communication is lower than a given restriction threshold value, at least one of a communication characteristic of the differential signaling, an application using data on the image captured by the camera, a frame rate in the camera, and an image-capturing area where the camera captures the image of the surroundings of the vehicle.

2. The control apparatus as set forth in claim 1, wherein when the value indicating the margin of communication derived by the margin-of-communication obtainer is lower than the restriction threshold value, the restriction determiner works to stop the differential signaling between the control apparatus and the camera.

3. The control apparatus as set forth in claim 1, wherein when the value indicating the margin of communication derived by the margin-of-communication obtainer is lower than the restriction threshold value, the restriction determiner reduces a communication rate as the communication characteristic which is a rate of the differential signaling between the control apparatus and the camera.

4. The control apparatus as set forth in claim 1, wherein the application includes a first application and a second application which is lower in order of priority than the first application, and wherein when the value indicating the margin of communication derived by the margin-of-communication obtainer is lower than the restriction threshold value, the restriction determiner stops delivering the data on the image to the second application.

5. The control apparatus as set forth in claim 4, wherein when the value indicating the margin of communication derived by the margin-of-communication obtainer is lower than the restriction threshold value, the restriction determiner decreases the frame rate as long as the first application is enabled to operate.

6. The control apparatus as set forth in claim 4, wherein when the value indicating the margin of communication derived by the margin-of-communication obtainer is lower than the restriction threshold value, the restriction determiner decreases the image-capturing area as long as the first application is enabled to operate.

7. The control apparatus as set forth in claim 1, wherein the restriction determiner is equipped with a threshold determining unit that determines the restriction threshold value as a function of an operating condition of the camera.

8. The control apparatus as set forth in claim 1, wherein when the value indicating the margin of communication derived by the margin-of-communication obtainer is lower than the restriction threshold value, the restriction determiner changes a driving capacity at a communication port as the communication characteristic.

9. The control apparatus as set forth in claim 1, wherein the external factor comprises an electrical disturbance, a mechanical vibration, or a change in temperature of the vehicle-mounted camera system.

* * * * *